United States Patent

Suzuki

[11] Patent Number: 5,841,801
[45] Date of Patent: Nov. 24, 1998

[54] DOUBLE WAVELENGTH LASER

[75] Inventor: Yoshikazu Suzuki, Tokyo, Japan

[73] Assignee: NEC Corporation, Tokyo, Japan

[21] Appl. No.: 762,167

[22] Filed: Dec. 9, 1996

[30] Foreign Application Priority Data

Dec. 13, 1995 [JP] Japan .................................. 7-323403

[51] Int. Cl.⁶ ...................................................... H01S 3/10
[52] U.S. Cl. ................................ 372/23; 372/20; 372/21; 372/69; 372/70; 372/71
[58] Field of Search .................. 372/20, 21, 22, 372/23, 32, 69, 70, 71, 43

[56] References Cited

FOREIGN PATENT DOCUMENTS

| 56-29323 | 3/1981 | Japan | 372/23 X |
| 64-10224 | 1/1989 | Japan | 372/23 X |
| 315832 | 1/1991 | Japan | 372/23 X |
| 4125526 | 4/1992 | Japan | 372/23 X |
| 6314832 | 11/1994 | Japan | 372/23 X |

*Primary Examiner*—Brian Healy
*Attorney, Agent, or Firm*—Ostrolenk, Faber, Gerb & Soffen, LLP

[57] ABSTRACT

In order to make an attempt to reduce the size of the laser and to simplify the structure, in a double wavelength laser of the invention, when an optical path switching mirror 3 is located at a position where light is not reflected, emitted light of a laser diode 1 is converted into parallel light with a collimator lens 2, light is collected to an Er: YAG crystal 6 with a collector lens 4 for pumping, light output by the pumping of the Er: YAG crystal 6 is amplified with a total reflective mirror 5 and an output mirror 7 and passes through a folded mirror 8 from the output mirror 7, and light is guided to a light guide unit 10 with a collector lens 9 to be emitted outside, and when the optical path conversion mirror 3 is located at a position where light is reflected, the emitted light of the laser diode 1 is reflected in 90 degrees direction with the optical path switching mirror 3 and is guided to the light guide unit 10 with a collector lens 11 to be emitted outside.

6 Claims, 4 Drawing Sheets

DOUBLE WAVELENGTH LASER

BACKGROUND OF THE INVENTION

1. Field of the Invention

The present invention relates to a double wavelength laser, and more particularly to a solid-state laser for oscillating infrared rays with a band having an oscillation wavelength of 1 μm to 3 μm by using a laser diode as a pumping light source of the solid-state laser.

2. Description of the Related Art

Conventionally, as a solid-state laser of this type, a neodium YAG (Nd: YAG) laser, a horomium YAG (Ho: YAG), an erbium YAG (Er: YAG) laser or the like for use in a medical laser scalpel or the like is used.

In the double wavelength laser which emits laser beams having two different kinds of wavelengths by using the solid-state laser as described above, there is known a method wherein two different kinds of laser media, for example, two sets of lasers, namely, a laser which uses an Nd: YAG crystal having an oscillation wavelength of 1.064 μm and a laser which uses an Er: YAG crystal having an oscillation wavelength of 2.94 μm are manufactured so that a power supply part for driving the lasers and a cooler are provided in one set of the laser, and the power supply part and the cooler are commonly used by the two sets of the lasers.

Furthermore, for the double wavelength laser, there is also available a method wherein a fundamental wave obtained from the laser is used as a first wavelength, and a SHG (Second Harmonic Generation) light is used as a second wavelength, the SHG light being obtained by the conversion of the wavelength of the fundamental wave in the laser beams into a half wavelength with a non-linear optical crystal called SHG crystal. Japanese Publication of Unexamined Patent Application No. SHO 64-10224 and Japanese Publication of Unexamined Patent Application No. SHO 56-29323 and the like disclose this method.

The solid laser uses a rod-like laser crystal (Nd: YAG rod or the like) to obtain laser beams having the first wavelength as the basic wave. To pump the laser crystal, a pumping lamp such as a krypton arc lamp or a xenon flash lamp or the like is used. In other words, the laser crystal and the pumping lamp are located at positions mutually parallel to each other and both the laser crystal and the pumping lamp are covered with a pumping cavity with an elliptical reflection surface.

The laser is constituted in this manner so that pumping light generated by the pumping lamp is collected in the Nd: YAG rod or the like which is a laser medium with the pumping cavity so that Nd ions inside of the crystal of the Nd: YAG rod or the like are pumped.

The light emission of the pumped Nd ions (having a wavelength of 1.064 μm in the case of the Nd: YAG crystal) is amplified by the travel of the Nd: YAG crystal between optical resonators which comprise a total reflective mirror and an output mirror located outside of both end surface of the Nd: YAG rod or the like to be taken out as laser beams.

On the other hand, the SHG light which is the second wavelength can be obtained by allowing a fundamental wave (having a wavelength of 1.064 μm in the case of the Nd: YAG crystal) to pass through the non-linear optical crystal.

The reason for the above fact results from a phenomenon in which light having a frequency two times longer than the crystal, namely light having a half wavelength is generated because a specific atom in the crystal is polarized with a vibration of an electric field having a light frequency when the fundamental wave laser beams pass through the crystal, with the result that polarization components having a double vibration frequency are generated with a mutual power field between atoms. As the non-linear optical crystal having the aforementioned advantage, generally a KTP crystal (potassium titanium phosphate crystal), a BBO crystal (barium borate crystal) or the like is widely used.

In the conventional double wavelength laser described above, a method which uses two different kinds of laser media requires two sets of light oscillators which constitute the laser with the result that the size of the laser becomes large.

Furthermore, since the method wherein the fundamental wave is used as the first wavelength and the SHG light is used as the second wavelength has a conversion efficiency from the fundamental wave to the SHG light which efficiency is about 20% in the SHG conversion method, no sufficient value can be easily obtained as a light output, and at the same time, the SHG crystal is likely to be damaged by the laser beams with the result that the method can be used only in the laser having an output of only several watts or less.

SUMMARY OF THE INVENTION

Therefore, an object of the invention is to solve the aforementioned problem and to attain a reduction of a size of a laser and a simplification of the structure thereof thereby providing a double wavelength laser which can be used with an output of several watts or more.

The double wavelength laser according to the present invention comprises a laser medium composed of either a solid or a solid crystal, laser diodes which emit pumping light to the laser medium, a collector lens for collecting the pumping light in the laser medium, laser pumping means which includes the laser medium and obtains laser beams by pumping the laser medium with the pumping light, switching means which is located between the laser diode and the collector lens and switches an optical path of the pumping laser light, a first light guide unit for guiding the LDS light to the outside, and a second light guide unit for guiding the solid-state laser beams to the outside.

Another double wavelength laser according to the present invention comprises conversion means which is located within the laser pumping means and converts the wavelength of the laser beams into a predetermined wavelength which has been determined in advance addition to the constitution.

Another double wavelength laser of the invention comprises a laser medium composed of either a solid or a solid crystal, laser diodes which emit pumping light to the laser medium, a collector lens for collecting the pumping light to the laser medium, laser pumping means which includes the laser medium and obtains laser beams by pumping the laser medium with the pumping light, switching means which is located between the laser diode and the collector lens and switches the optical path of the pumping light, a light guiding unit for guiding the laser beams obtained from the laser pumping means to the outside, and a optical system for folding the pumped light which is switched with the switching means to allow the light to be incident on the light guide unit.

Still another double wavelength laser according to the present invention comprises conversion means which is located in the laser pumping means and converts the laser beams into a predetermined wavelength which has been determined in advance.

The double wavelength laser according to the present invention uses as the first wavelength the laser beams obtained from the laser wherein the emitted light from the laser diode serves as the pumped light while using as the second wavelength emitted light from the laser diode as it is.

Consequently, the double wavelength laser can attain a reduction of a size and a simplification of the structure thereof because a wavelength conversion device of a new laser medium, the SHG crystal or the like is used for obtaining the second pumping wavelength as can be seen the conventional double wavelength laser, which eliminates the need of switching and using the device. Furthermore, the invention also eliminates the need of locating the SHG crystal outside of the solid-state laser so that the laser of the invention can be used at an output of several watts or more.

DESCRIPTION OF THE PREFERRED EMBODIMENT

Figure 1:
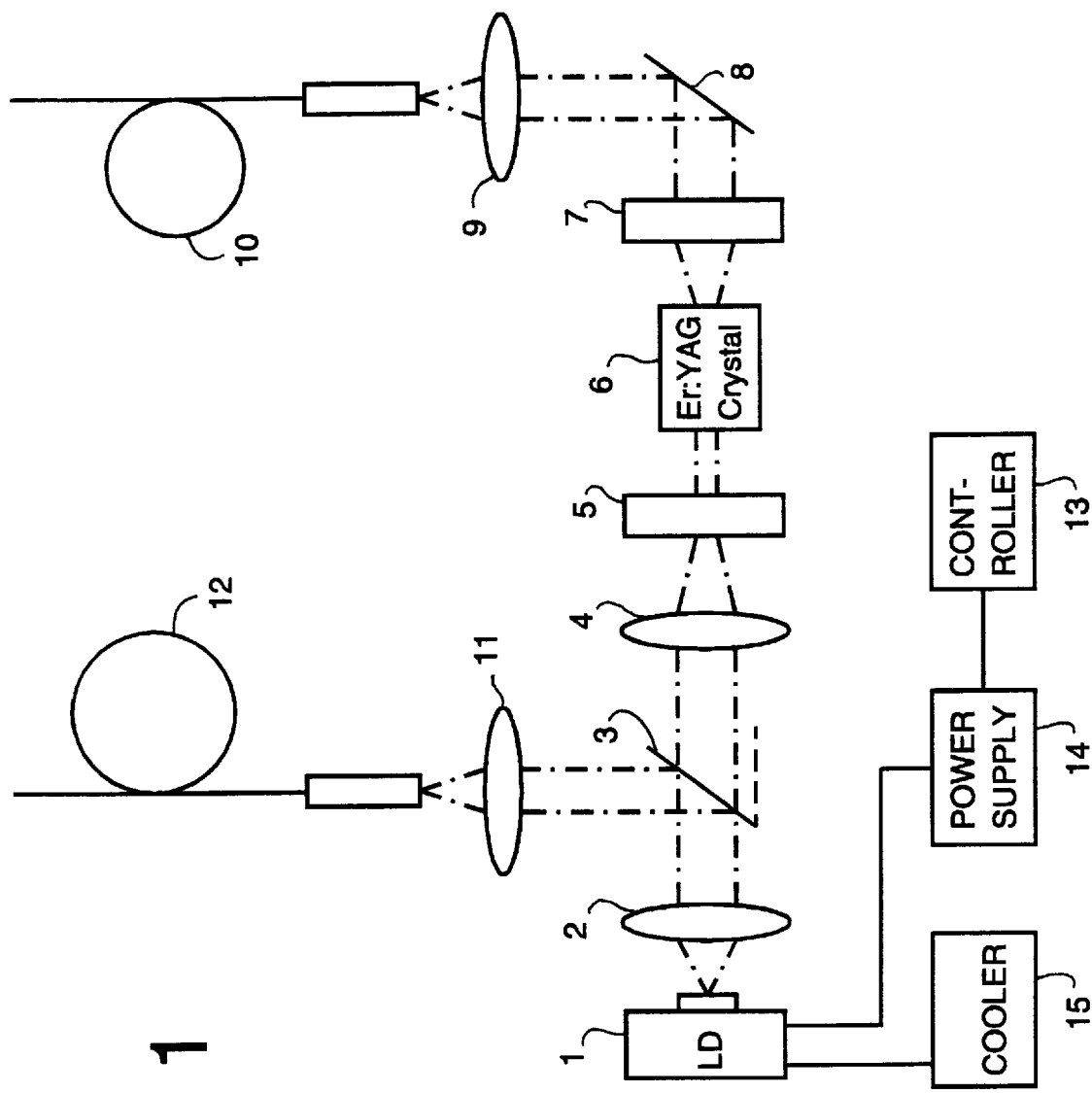
FIG. 1 is a block diagram showing one embodiment of the resent invention.

Embodiments of the present invention will be explained by referring to the drawings. FIG. 1 is a block diagram showing one embodiment of the invention. In FIG. 1, a laser diode (LD) emits infrared light having a wavelength of 960 nm or a wavelength of 1480 nm.

Light from this laser diode 1 is converted into parallel light with a collimator lens 2. The light which has been converted into the parallel light is guided to an optical fiber which is either a solid-state laser part or a direct output part with an optical path switching mirror 3.

In the case where the emitted light from the laser diode 1 is guided to the solid-state laser part, the optical path switching mirror 3 is located at a position where light is not reflected. Consequently, the emitted light from the laser diode 1 which has traveled straightly from the collimator lens 2 is collected to the Er: YAG crystal 6 with the collector lens 4 for pumping.

Inside of the Er: YAG crystal 6, the infrared light having a wavelength of about 960 nm or 1480 nm is absorbed so that the Er ions in a pumped state are guided and emitted to the light having a wavelength of 2.94 $\mu$m.

Light having a wavelength of 2.94 $\mu$m from the Er: YAG crystal 6 is amplified by the travel of the crystal 6 between optical resonators comprising a total reflective mirror 5 and an output mirror 7, and passes through a folded mirror 8 from the output mirror 7 to be guided to a light guide unit 10 comprising a fluoride optical fiber with the collector lens 9.

In the case where the emitted light from the laser diode 1 which is the second wavelength is output, the emitted light from the laser diode 1 is reflected in 90 degrees direction with an optical path switching mirror 3. The light reflected by the optical path switching mirror 3 is guided to a light guide unit 12 comprising an optical fiber or the like with a collector lens 11.

Consequently, the double wavelength laser according to a first embodiment of the invention emits Er: YAG laser beams having a wavelength of 2.94 $\mu$m from a light emitting part of the light guide unit 10, and emits light from the laser diode 1 having a wavelength of 960 nm or 1480 nm from a light emitting part of the light guide unit 12.

In FIG. 1, reference numeral 13 denotes a controller which controls an operation and an output of the laser diode 1, 14 a power supply for driving the laser diode 1, and 15 a cooler for suppressing the heating of the laser diode 1.

Figure 2:
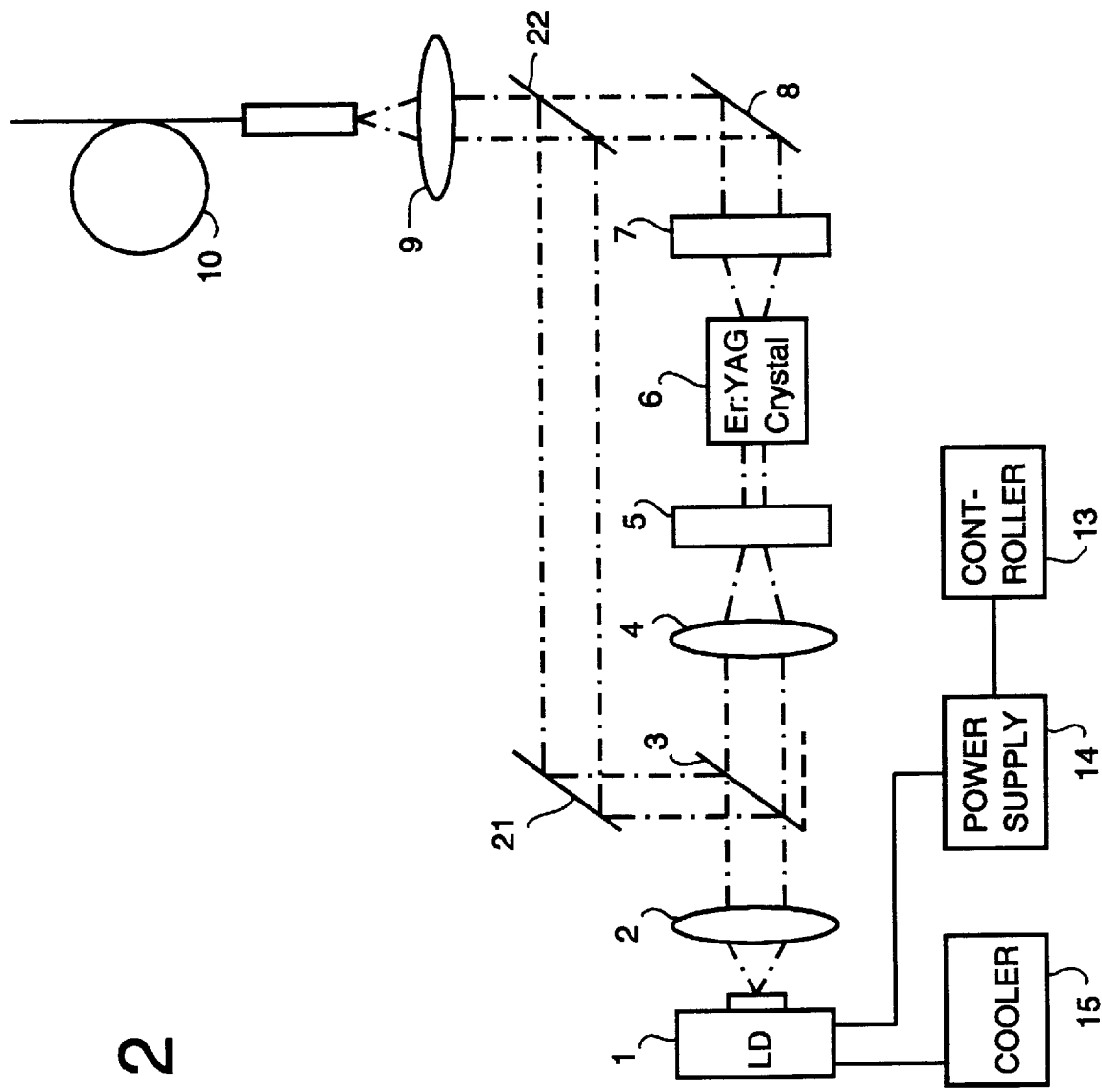
FIG. 2 is a block diagram showing another embodiment of the invention.

FIG. 2 is a block diagram showing a second embodiment of the invention. In FIG. 2, the laser diode 1 emits infrared light having a wavelength of 960 nm or 1480 nm. The light emitted from this laser diode 1 is converted into parallel light with the collimator lens 2. The light which has been converted into parallel light is guided to an optical fiber which is either a solid laser part or a direct output part with an optical path switching mirror 3.

In the case where the emitted light from laser diode 1 is guided to the solid-state laser part, the optical path switching mirror 3 is located at a position where light is not reflected. Consequently, the emitted light from the laser diode 1 which has traveled straightly from the collimator lens 2 is collected in the Er: YAG crystal 6 with the collector lens 4 for pumping.

Inside of the Er: YAG crystal 6, the infrared light having a wavelength of about 960 nm or 1480 nm is absorbed, and the Er ions in the pumped state are guided and discharged with respect to light having a wavelength of 2.94 $\mu$m.

Light having a wavelength of 2.94 $\mu$m from the Er: YAG crystal 6 is amplified by the travel of the crystal 6 between the optical resonators comprising a total reflective mirror 5 and an output mirror 7, and passes through a folded mirror 21 from the output mirror 7 to be guided to a dichromatic mirror 22.

In the case where the emitted light from the laser diode 1 which is the second wavelength is output, the emitted light from the laser diode 1 is reflected in 90 degrees direction with the optical path switching mirror 3. The light reflected by the optical path switching mirror 3 passes through the folded mirror 21 to be guided to the dichromatic mirror 22.

The dichromatic mirror 22 controls the reflection and the transmittance with the wavelength. The dichromatic mirror 22 provides a total reflection in 90 degrees direction with respect to the light having a wavelength of 960 nm (or 1480 nm ) while the dichromatic mirror 22 becomes a mirror provided with a light-transmitting coating with respect to light having a wavelength of 2.94 $\mu$m.

Consequently, the emitted light from the folded mirror 12 having a wavelength of 960 nm or 1480 nm is totally reflected in 90 degrees direction with the dichromatic mirror 22, and passes through the collector lens 9 to be guided to the light guide unit 10. Furthermore, the Er: YAG laser beams having a wavelength of 2.94 $\mu$m passes through the dichromatic mirror 22 from the folded mirror 8, and passes through the collector lens 9 to be guided to the light guide unit 10.

Therefore, the double wavelength laser according to the second embodiment of the invention emits from an light emitting part of the light guide unit 10 comprising an optical fiber or the like Er: YAG laser beams having a wavelength of 2.94 $\mu$m as well as either light having a wavelength of 960 nm or light having a wavelength of 1480 nm with the switching of the optical path switching mirror 3.

Figure 3:
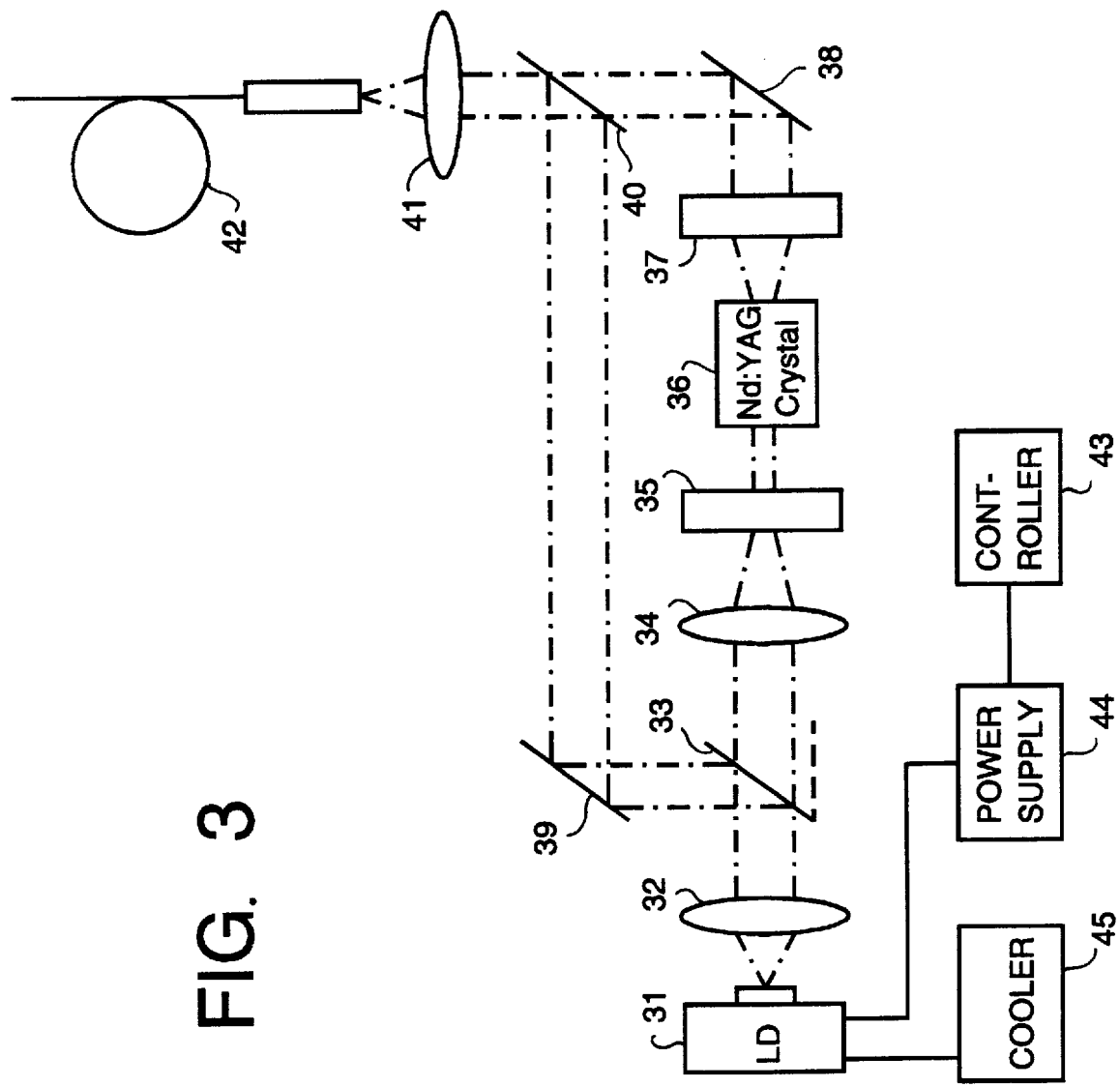
FIG. 3 is a block diagram showing still another embodiment of the invention.

FIG. 3 is a block diagram showing a third embodiment of the invention. In FIG. 3, the laser diode (LD) 31 has emitted light having an oscillation wavelength of 810 nm which is suitable for pumping the Nd: YAG crystal having an oscillation wavelength of 1064 nm which is widely used in a laser processor, a laser scalpel or the like.

Light from the laser diode 31 is converted into parallel light with the collimator lens 32. The light which has been converted to the parallel light is guided to the optical fiber which is a solid-state laser part or a direct output part with the optical path switching mirror 33.

In the case where the emitted light from the laser diode 31 is guided to the solid-state laser, the optical path switching mirror 33 is located at a position where light is not reflected. Consequently, the emitted light from the laser diode 31 which has traveled straightly from the collimator lens 32 is collected in the Nd: YAG crystal 36 with the collector lens 34 for pumping.

The light of the Nd: YAG crystal 36 is taken out as laser beams having a wavelength of 1064 nm with the total reflective mirror 35 and the output mirror 37 to be guided to the dichromatic mirror 40 with the folded mirror 38.

In the case where the emitted light from the laser diode 31 which is the second wavelength is output, the emitted light from the laser diode 31 is reflected in 90 degrees direction with the optical path switching mirror 33. The light reflected by the optical path switching mirror 33 passes through the folded mirror 39 to be guided to the dichromatic mirror 40.

The dichromatic mirror 40 controls the reflection and the transmittance with the wavelength. The double wavelength mirror 40 provides a total reflection in 90 degrees direction with respect to light having a wavelength of 810 nm while the dichromatic mirror 40 becomes a mirror provided with a light-transmitting coating with respect to light having a wavelength of 1064 nm.

Consequently, the emitted light of the laser diode 31 having a wavelength of 810 nm from the folded mirror 39 is totally reflected in 90 degrees direction with the dichromatic mirror 40, and passes through the collector lens 41 to be guided to the light guide unit 42.

Furthermore, the Nd: YAG laser beams having a wavelength of 1064 nm pass through the double wavelength mirror 40 from the folded mirror 38, and pass through the collector lens 41 to be guided to the light guide unit 42.

Consequently, the double wavelength laser according to a third embodiment of the invention emits from a light emitting part of the light guide unit 42 comprising an optical fiber or the like Nd: YAG laser beams having a wavelength of 1064 nm or Nr: YAG laser beams having a wavelength of 810 nm with the switching of the optical path switching mirror 33.

In FIG. 3, reference numeral 43 denotes a controller which controls an operation and an output of the laser diode 31, 44 a power supply for driving a laser diode 31, and 45 a cooler for suppressing heating of the laser diode 31.

Figure 4:
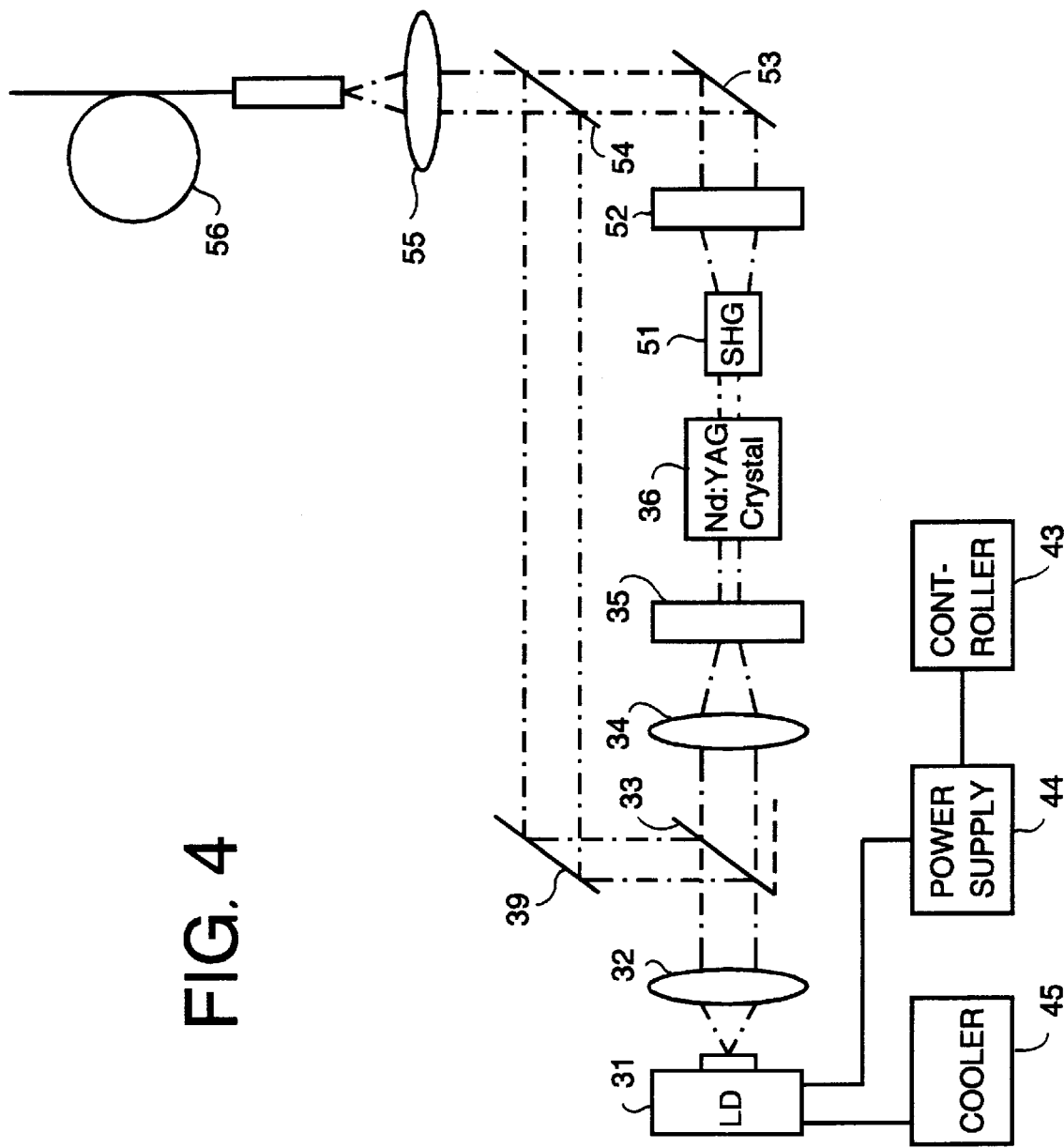
FIG. 4 is a block diagram showing still another embodiment of the invention.

FIG. 4 is a block diagram showing a fourth embodiment of the invention. The laser diode 31 has emitted light having an oscillation wavelength of 810nm suitable for pumping the Nd: YAG crystal having an oscillation wavelength of 1064 nm which is widely used in a laser processor, a laser scalpel or the like.

The light from the laser diode 31 is converted into parallel light with the collimator lens 32. The light which has been converted into the parallel light is guided to the solid-state laser part or a direct output part with the optical path switching mirror 33.

In the case where the emitted light from the laser diode 31 is guided to the solid-state laser part, the optical path switching mirror 33 is located at a position where light is not reflected. Consequently, the emitted light from the laser diode 31 which has traveled straightly from the collimator lens 32 is collected to the Nd: YAG crystal 36 with the collector lens 34 for pumping.

In the fourth embodiment of the invention, an SHG crystal 51 is located inside of the optical resonator comprising a total reflective mirror 35 and an SHG output mirror 52 so that SHG light can be obtained efficiently after the Nd: YAG crystal 36 is pumped.

As described above, the optical resonator is constituted so that the laser having a wavelength of 1064 nm is oscillated with the Nd: YAG crystal 36 and the SHG output mirror 52. Here, the light having a wavelength of 1064 nm cannot be taken out because the SHG output mirror 52 is totally reflected inside of the optical resonator.

The SHG crystal 51 is a crystal such as KTP (potassium titanium phosphate) or BBO (barium borate) or the like, and the oscillation light having a wavelength of 1064 nm is converted into SHG light having a wavelength of 532 nm. The SHG light which has been converted is guided to the dichromatic mirror 54 with the folded mirror 53.

In the case where the emitted light from the laser diode 31 which is the second wavelength is output, the emitted light from the laser diode 31 is reflected in 90 degrees direction with the optical path switching mirror 33. The light reflected by the optical path switching mirror 33 passes through the folded mirror 39 to be guided to the double wavelength mirror 54.

The dichromatic mirror 54 controls the reflection and the transmittance with the wavelength. The dichromatic mirror 54 is totally reflected in 90 degrees direction with respect to light having a wavelength of 810 nm while the double wave length mirror becomes a mirror provided with a light-transmitting coating with respect to light having a wavelength of 532 nm.

Consequently, the emitted light of the laser diode 31 from the folded mirror 39 is totally reflected in 90 degrees direction with respect to light having a wavelength of 810 nm, and passes through the collector lens 55 to be guided to the light guide unit 56. Furthermore, light having a wavelength of 532 nm passes through the dichromatic mirror 54 from the folded mirror 53*m*, and passes through the collector lens 55 to be guided to the light guide unit 56.

Consequently, the double wavelength laser according to the fourth embodiment of the invention emits from light emitting part of the light guide unit 56 comprising an optical fiber or the like either light having a wavelength of 532 nm or light having a wavelength of 810 nm with the switching of the optical path switching mirror 33. Incidentally, since the SHG crystal 51 is located inside of the solid-state laser, the SHG crystal 51 can be used more efficiently and at a high output inside rather than outside of the solid- state laser.

In this manner, the double wavelength laser of the invention switches light from the laser diode 1 which emits pumping light to the Er: YAG crystal 6 with the optical path switching mirror 3 to be guided to the outside from the light guide unit 12 while at the same time guiding laser beams obtained by pumping the Er: YAG crystal 6 to the outside from the light guide unit 10 with the result that an attempt can be made to reduce the size of the laser and simplify the structure thereof. Furthermore, the invention eliminates the need of locating the SHG crystal outside of the solid-state laser so that the laser can be used at an output of several watts or more.

Furthermore, the double wavelength laser of the invention switches light from the laser diodes 1 and 31 for emitting the pumped light either to the Er: YAG crystal 6 or to the Nd: YAG crystal 36 with optical path switching mirrors 3 and 33 so that either laser beams obtained by pumping the Nr: YAG crystal 6 or the Nr: YAG crystal 36 with light from the laser diodes 1 and 31 which has been switched with the optical path switching mirrors 3 and 33 or light from the laser diodes 1 and 31 which has been switched with the optical path switching mirrors 3 and 33 is guided to the outside from the same light guide units 10, 40 and 56. At the same time, an attempt can be made to reduce the size of the laser and to simplify the structure thereof by guiding the light to the outside, and then the laser can be used at an output of several watts or more.

As described above, the double wavelength laser of the invention has an advantage in that an attempt can be made to reduce the size of the laser and to simplify the structure thereof and the laser can be used with an output of several watts by switching with the switching means the optical path of the light from the laser diodes for emitting pumping light to the laser medium composed either of a solid or a solid crystal, guiding to the outside light from the laser diode which has been switched with the switching means, and at the same time guiding to the outside laser beams obtained by pumping the laser medium with light from the laser diode which has been switched with the switching means.

Furthermore, another double wavelength laser of the invention has an advantage in that an attempt can be made to reduce the size of the laser and to simplify the structure thereof, and the laser can be used with an output of several watts or more by switching the optical path of light from the laser diode which emits pumping light to the laser medium composed of either of a solid or a solid crystal, and guiding with the same guiding means either laser beams obtained by pumping the laser medium with light from the laser diode which has been switched with the switching means or light from the laser diode which has been switched with the switching means.

What is claimed is:

1. A double wavelength laser comprising:
    a laser medium composed of either a solid or a solid crystal;
    a laser diode which emits pumping light to the laser medium at a first wavelength;
    a collector lens for collecting the pumping light in the laser medium;
    laser pumping means which includes the laser medium and obtains laser beams at a second wavelength by pumping the laser medium with the pumping light;
    switching means which is located between the laser diode and the collector lens and switches an optical path of the pumping light;
    a first light guide means for guiding the pumping light at the first wavelength switched with the switching means to the outside; and
    a second light guide means for guiding the laser beams at the second wavelength pumped from the laser pumping means to the outside.

2. A double wavelength laser according to claim 1 wherein the laser further comprises conversion means which is located within the laser pumping means and converts the second wavelength of the laser beams into a predetermined wavelength which has been determined in advance.

3. A double wavelength laser according to claim 2 wherein the conversion means includes a non-linear crystal which converts the second wavelength of the laser beams into either of a half wavelength, one third wavelength and one fourth wavelength.

4. A double wavelength laser comprising:
    a laser medium composed of either a solid or a solid crystal;
    a laser diode which emits pumping light at a first wavelength;
    a collector lens for collecting the pumping light to the laser medium;
    laser pumping means which includes the laser medium and obtains laser beams at a second wavelength by pumping the laser medium with the pumping light;
    switching means which is located between the laser diode and the collector lens and switches an optical path of the pumping light;
    a light guiding unit for guiding the laser beams obtained from the laser pumping means to the outside; and
    an optical system for folding the pumping light switched with the switching means to allow the light to be incident on the light guide unit.

5. A double wavelength laser according to claim 4 further comprising a conversion means which is located in the laser means and which converts the second wavelength of the laser beams into a predetermined wavelength which has been determined in advance.

6. A double wavelength laser according to claim 5 wherein the conversion means includes a non-linear crystal which converts the second wavelength of the laser beams into either of a half wavelength, one third wavelength and one fourth wavelength.

\* \* \* \* \*

UNITED STATES PATENT AND TRADEMARK OFFICE
CERTIFICATE OF CORRECTION

PATENT NO. : 5,841,801
DATED : November 24, 1998
INVENTOR(S) : Yoshikazu SUZAKI

It is certified that error appears in the above-indentified patent and that said Letters Patent is hereby corrected as shown below:

On the title page of the patent at Item [73], change the Assignee to:

--NEC Corporation, Tokyo Japan and
 J. Morita Manufacturing Coporation, Kyoto Japan--.

Signed and Sealed this

Twenty-sixth Day of October, 1999

Attest:

Q. TODD DICKINSON

Attesting Officer    Acting Commissioner of Patents and Trademarks